US008800930B1

(12) United States Patent
Bourakov et al.

(10) Patent No.: US 8,800,930 B1
(45) Date of Patent: Aug. 12, 2014

(54) AERIAL DELIVERY SYSTEM WITH HIGH ACCURACY TOUCHDOWN

(75) Inventors: Eugene Bourakov, Carmel, CA (US); Oleg Yakimenko, Seaside, CA (US); Alex Bordetsky, Carmel, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 102 days.

(21) Appl. No.: 13/053,682

(22) Filed: Mar. 22, 2011

Related U.S. Application Data (60) Provisional application No. 61/316,217, filed on Mar. 22, 2010.

(51) Int. Cl.
*B64D 17/00* (2006.01)

(52) U.S. Cl.
USPC .......................................................... 244/152

(58) Field of Classification Search
USPC .................. 244/53 R, 138 R, 17.17, 139, 152
See application file for complete search history.

(56) References Cited

U.S. PATENT DOCUMENTS

| | | | | |
|---|---|---|---|---|
| 2,545,248 | A * | 3/1951 | Winzen et al. | ............ 244/138 R |
| 3,564,543 | A | 2/1971 | Nehama et al. | |
| 5,992,794 | A * | 11/1999 | Rotman et al. | ............ 244/17.17 |
| 6,343,244 | B1 | 1/2002 | Yoneda et al. | |
| 6,416,019 | B1 | 7/2002 | Hilliard et al. | |
| 6,758,442 | B2 | 7/2004 | Bailey | |
| 6,808,144 | B1 | 10/2004 | Nicolai et al. | |
| 8,401,860 | B1 | 3/2013 | Evans | |
| 2006/0076455 | A1* | 4/2006 | Ljungberg et al. | ........... 244/3.13 |
| 2007/0088466 | A1 | 4/2007 | Preston | |
| 2007/0272801 | A1 | 11/2007 | Hilliard et al. | |
| 2007/0284474 | A1 | 12/2007 | Olsen et al. | |
| 2008/0149775 | A1* | 6/2008 | Dunker et al. | ................ 244/147 |
| 2009/0026319 | A1 | 1/2009 | Strong | |
| 2010/0228408 | A1 | 9/2010 | Ford et al. | |
| 2011/0192938 | A1* | 8/2011 | DiMarzio et al. | ........... 244/53 R |

FOREIGN PATENT DOCUMENTS

EP          1657611 B1      9/2009

OTHER PUBLICATIONS

Slegers, N.J., and Yakimenko, O.A. "Optimal Control for Terminal Guidance of Autonomous Parafoils." Proceedings of the 20th AIAA Aerodynamic Decelerator Systems Technology Conference, Seattle, WA, May 4-7, 2009. AIAA 2009-2958. pp. 1-21.

(Continued)

*Primary Examiner* — Valentina Xavier
(74) *Attorney, Agent, or Firm* — Naval Postgraduate School; Lisa A. Norris (57) ABSTRACT

Embodiments described herein provide a system and method for persistent high-accuracy payload delivery utilizing a two-phase procedure during the terminal descent phase of aerial payload delivery. In the first phase a small parafoil provides aerial delivery of a payload to within a close proximity of an intended touchdown point, e.g., a target. In the second phase a target designator acquires the target and a trajectory to the target is determined. A harpoon launcher deploys a harpoon connected to the payload by an attachment line, such as a rope. A reel mechanism reels up the attachment line causing the payload to be moved to the target thus providing high accuracy touchdown payload delivery.

4 Claims, 6 Drawing Sheets

(56) References Cited

OTHER PUBLICATIONS

Yakimenko, O.A., Slegers, N.J., and Tiaden, R. "Development and Testing of the Miniature Aerial Delivery System Snowflake." Proceedings of the 20th AIAA Aerodynamic Decelerator Systems Technology Conference, Seattle, WA, May 4-7, 2009. AIAA 2009-2980. pp. 1-15.

Bourakov, E.A., Yakimenko, O.A., and Slegers, N.J. "Exploiting a GSM Network for Precise Payload Delivery." Proceedings of the 20th AIAA Aerodynamic Decelerator Systems Technology Conference, Seattle, WA, May 4-7, 2009. AIAA 2009-3004. pp. 1-14.

Hewgley, C.W., and Yakimenko, O.A. "Precision Guided Airdrop for Vertical Replenishment of Naval Vessels." Proceedings of the 20th AIAA Aerodynamic Decelerator Systems Technology Conference, Seattle, WA, May 4-7, 2009. AIAA 2009-2995. pp. 1-13.

Yakimenko, O.A., Slegers, N.J., Bourakov, E.A., Hewgley, C.W., Bordetsky, A.B., Jensen, R.P., Robinson, A.B., Malone, J.R., and Heidt, P.E.,"Mobile System for Precise Aero Delivery with Global Reach Network Capability." ICAA 2009. IEEE International Conference on Control and Automation, 2009. Dec. 9-11, 2009. pp. 1394-1398.

Brown, G., Haggard, R., and Fogleman, J. "Parafoils for Shipboard Recovery of UAVs." 1991, American Institute of Aeronautics and Astronautics, Inc. AIAA 91-0835-CP. pp. 48-53.

Carter, D.W., George, S., Hattis, P.D., McConley, M.W., Rasmussen, S.A., Singh, L. And Tavan S. "Autonomous Large Parafoil Guidance, Navigation, and Control System Design Status." 19th AIAA Aerodynamic Decelerator Systems Technology Conference and Seminar, May 21-24, 2007, Williamsburg, VA. AIAA 2007-2514. pp. 1 -15.

Firefly brochure. [retrieved on Mar. 13, 2013]. Retrieved from the Internet: <URL:http://www.airborne-sys.com/pages/view/firefly>.

\* cited by examiner

AERIAL DELIVERY SYSTEM WITH HIGH ACCURACY TOUCHDOWN

CROSS-REFERENCE TO RELATED APPLICATIONS

This application claims the benefit of U.S. Provisional Application No. 61/316,217, filed Mar. 22, 2010, which is hereby incorporated in its entirety by reference.

BACKGROUND OF THE INVENTION

1. Field of the Invention

The present invention relates to aerial delivery systems, and, more particularly, to parafoil-based payload delivery systems.

2. Description of the Related Art

Maneuverable ram-air parafoils are widely used today. The list of users includes skydivers, smoke jumpers, and specialized defense forces. The extended range of ram-air parafoils compared to round parachutes makes ram-air parafoils very practical for payload delivery. Further, the touchdown accuracy requirement for parafoil-based systems should be much tighter that round parachutes, but it largely depends on a guidance, navigation and control (GNC) unit to produce and execute the corresponding steering commands.

Recent introduction of the Global Positioning System (GPS) made the development of fully autonomous ram-air parafoils possible. Autonomous parafoil capability means delivery of the parafoil system, typically including a payload, to a desired landing point, e.g., a target, from a release point using an onboard computer, sensors and actuators. A navigation subsystem manages data acquisition, processes sensor(s) data, and provides guidance and control subsystems with information about the parafoil. Using this information along with local wind profiles, the guidance subsystem determines the delivery and generates a feasible descent trajectory all the way down to the desired impact point, i.e., the target. The control subsystem tracks this trajectory using the information provided by the navigation subsystem and onboard actuators.

Introduction of the GPS (Global Positioning System) allowed the development of fully autonomous different-weight aerodynamic decelerator systems. Realistically, it was desirable to have payloads aerially delivered from large standoff distances with persistent <100 m circular error probable (CEP) accuracy. Accordingly, during the last decade, several GNC concepts for gliding parachute applications have been developed and tested. Specifically, some systems were demonstrated during Precision Airdrop Technology Conference and Demonstrations (PATCAD) held at the U.S. Army Yuma Proving Ground, Yuma, Ariz., e.g., PATCAD-2001, PATCAD-2003, PATCAD-2005, PATCAD-2007, and PATCAD-2009, and Precision Airdrop Demonstration Capability PCAD-2006 and PCAD-2008 held near Bordeaux, France. However, touchdown accuracy of parafoil systems was still problematic, especially with small parafoils having light weight payloads. Accurate delivery of a light-weight payload (10-15 pounds) with a small parafoil on target was very difficult because small parafoils are very sensitive to wind, e.g. the trajectories are easily impacted by wind.

SUMMARY OF THE INVENTION

Embodiments in accordance with the invention address the terminal phase of the guided descent of a parafoil delivered payload, where the majority of errors contribute to the final touchdown accuracy. Embodiments in accordance with the invention can be beneficially implemented in the area of light weight payload (10-15 pounds) delivery by a small aerial parafoil. Such small parafoil systems are very sensitive to wind.

In accordance with one embodiment, persistent high accuracy touchdown payload delivery is attained by implementing a two-phase aerial delivery procedure. The first phase employs a small parafoil air delivery of a payload within close proximity of a target. The second phase employs a target designator and harpoon launcher that provide high accuracy delivery of the payload by anchoring the payload to the target with a harpoon and rope deployed from the harpoon launcher, and subsequently reeling the payload to the target.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Figure 1:
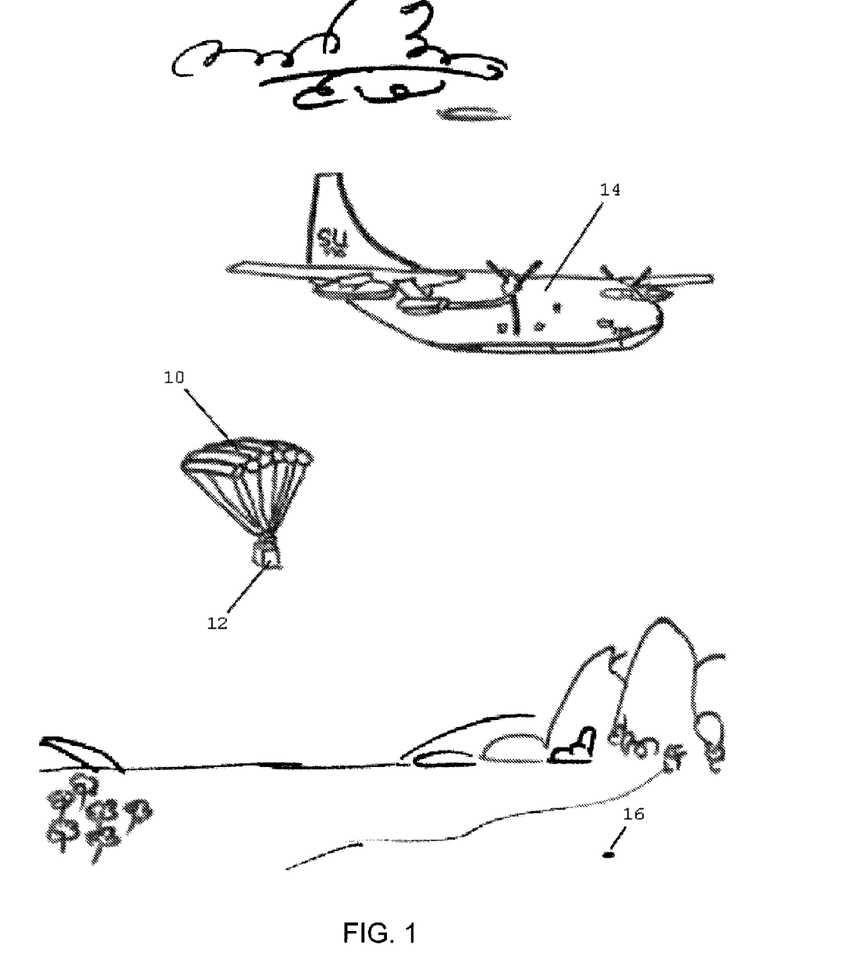
FIG. 1 illustrates a parafoil delivering a payload after being dropped from an aircraft in accordance with one embodiment.

FIG. 1 illustrates a parafoil 10 delivering a payload 12 after being dropped from an aircraft 14 in accordance with one embodiment. In one embodiment, parafoil 10 is a high-glide ratio ram-air parafoil. In other embodiments, parafoil 10 can be a different type of parafoil suitable for delivery of payload 12.

In one embodiment, parafoil 10 steers towards a target 16 in accordance with directions provided by a guidance, navigation and control (GNC) system.

In one embodiment, there are two phases of the final descent phase of parafoil 10. The first phase, herein also referred to as final phase one, is descent of parafoil 10 within a close proximity of target 16. The second phase, herein also referred to as final phase two, is anchoring of parafoil 10 to target 16 while still in the air, and subsequent reeling of payload 12 to target 16 as further described and shown in FIGS. 2-6. More specifically, in final phase two, a target trajectory is determined by a GNC system, and a harpoon, or other attachment device, is deployed from payload 12 and anchored at target 16. A rope, or other attachment mechanism, connecting the harpoon and payload 12 forms a link between payload 12 and target 16. Payload 12 is then moved to target 16 as the connecting rope is reeled up, thus providing high accuracy touchdown of payload 12 delivery to target 16.

Figure 2:
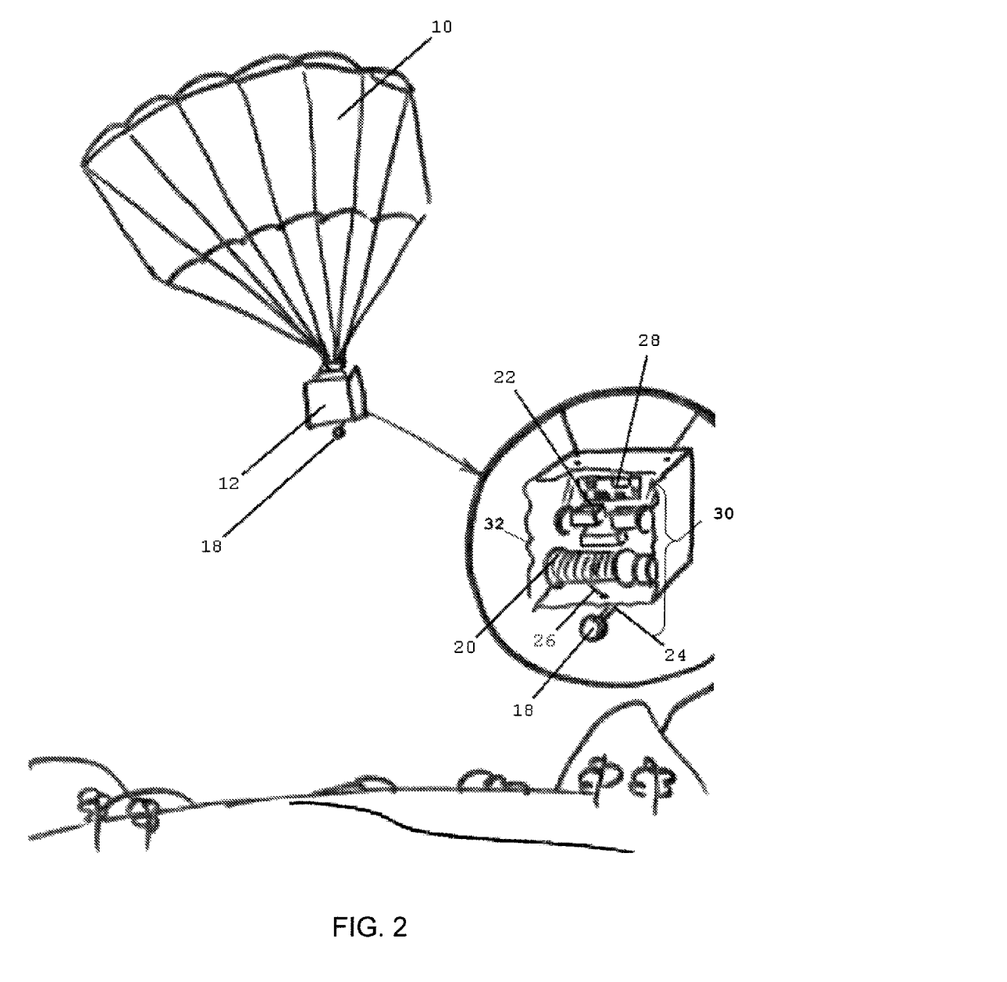
FIG. 2 illustrates the airborne parafoil with payload in accordance with one embodiment.

FIG. 2 illustrates airborne parafoil 10 with payload 12 in accordance with one embodiment. In one embodiment, payload 12 includes a high accuracy touchdown delivery system 30 together with one or more mission related components, also referred to herein as one or more sub-payload(s) (not shown). For example, the one or more sub-payloads, can include but are not limited to medical supplies, food, electrical equipment, and munitions. In one embodiment, high accuracy touchdown delivery system 30 includes: a guidance, navigation and control (GNC) system 28, an optical target designator 22, a harpoon 18, a harpoon launcher 24, a reel mechanism 20, and a rope 26 attached to harpoon 18 at one end, e.g., a front end of the rope, and attached to reel mechanism 20 at the opposite end, e.g., a back end of the rope. In some embodiments, payload 12 is encased partially or completely in a protective container 32.

In one embodiment, reel mechanism 20 includes a reel that allows rope 26 to be taken up on to the reel after deployment. Reel mechanisms are well known to those of skill in the art and are not further described in detail herein. Rope 26 can be any of a variety of deployable connectors, such as natural fiber ropes, synthetic material ropes, metal wire ropes, chain link ropes, or other suitable connector rope. Herein the phrase autonomous parafoil capability means the ability to deliver a payload to a target from a release point (within a corresponding reach distance) using an onboard computer and sensors of a guidance, navigation and control (GNC) system.

In one embodiment, in final phase one, guidance, navigation and control (GNC) system 28 manages data acquisition, processes sensor(s) data, generates a feasible trajectory to a target, e.g., target 16, and provides guidance and control by onboard actuators. In one embodiment, when parafoil 10 is in close proximity of target 16, for example, in a range of about 100-200 feet, optical target designator 22 starts to search for target 16.

Figure 3:
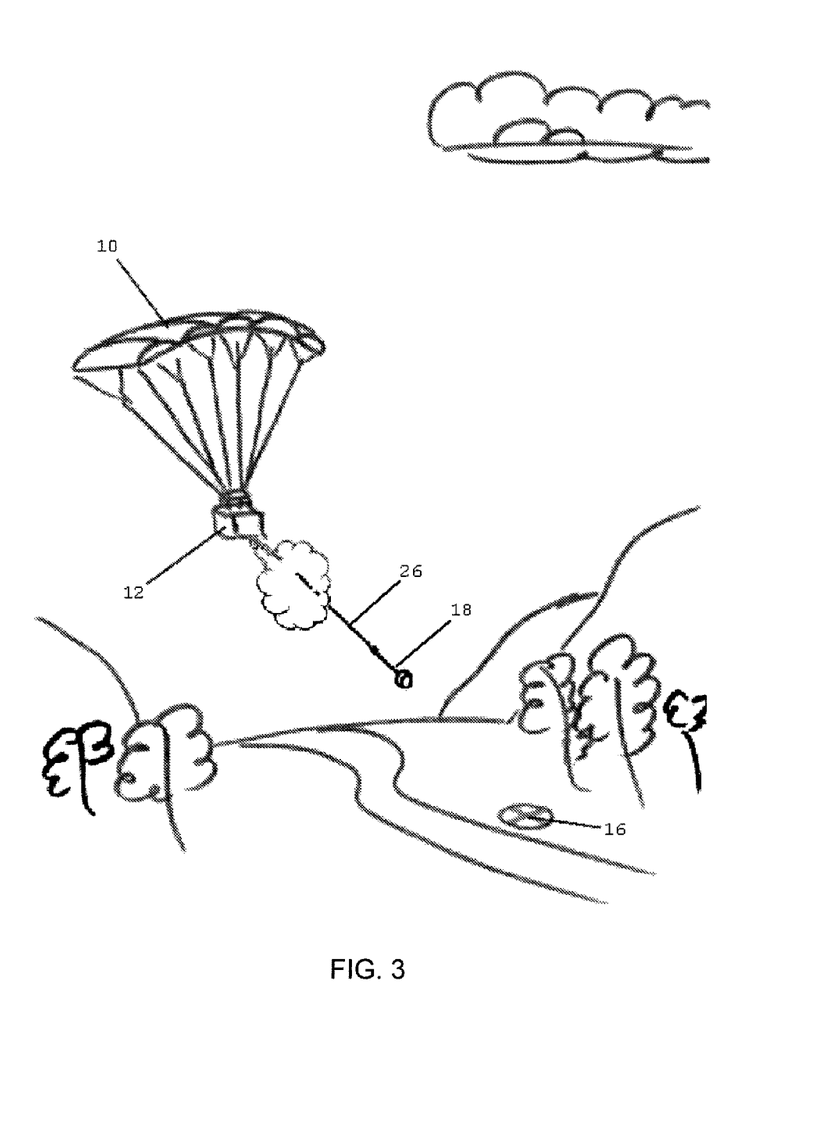
FIG. 3 illustrates a descent phase when a target is acquired and is in the optical line of sight with a harpoon launcher in accordance with one embodiment.

FIG. 3 illustrates the phase when target 16 has been designated and is in the optical line of sight with harpoon launcher 24 in accordance with one embodiment. In one embodiment, when target 16 is acquired by optical target designator 22 and is in the optical line of sign with harpoon launcher 24 and is within a distance range of the length of rope 26, guidance, navigation and control (GNC) system 28 initiates the command to trigger harpoon launcher 24. In final phase two, harpoon 18 is launched from harpoon launcher 24 and is aerially deployed toward target 16. Herein harpoon 18 can be any of a wide variety of anchoring tools that can firmly attach to a target, i.e., target 16, such as at, near or below the surface of target 16. Thus, for example, in various embodiments, harpoon 18 can be an arrow-type harpoon for dirt grounding, a strong magnet harpoon for a metal surface, a "sticky ball" harpoon made of highly adhesive material for a non-magnetic surface, etc. Herein harpoon launcher 24 can be any of a wide variety of devices that can aerially launch harpoon 18. For example, in various embodiments, harpoon launcher 24 can be a pneumatic, electromagnetic, pyrotechnic, or other such device that provides harpoon 18 projectile deliveries within about a 100-200 feet range.

Figure 4:
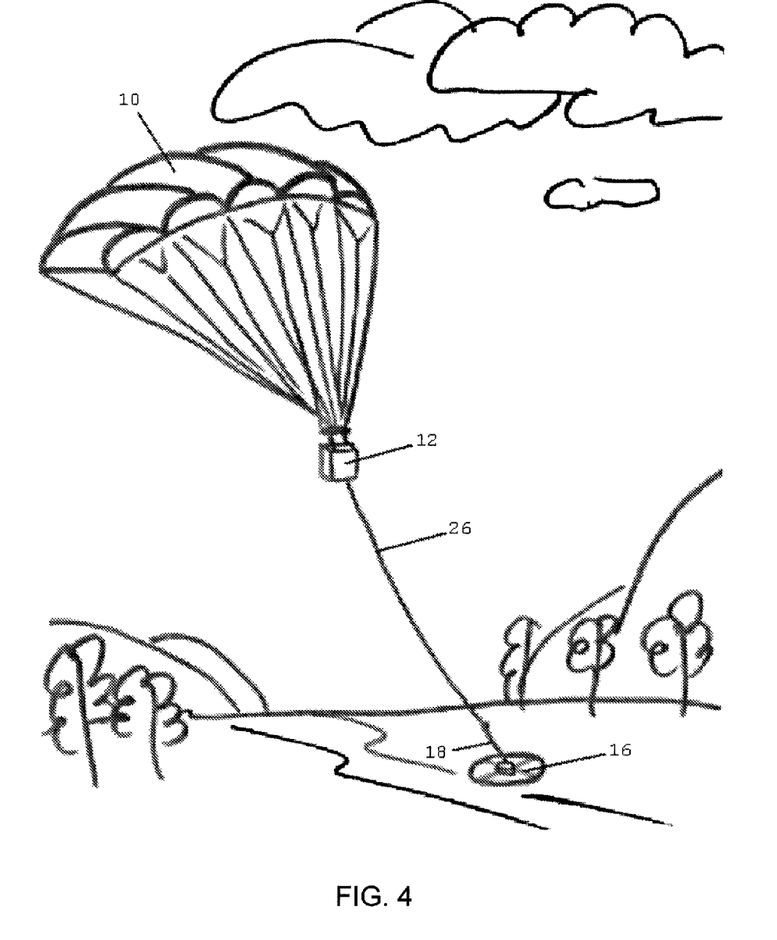
FIG. 4 illustrates the airborne parafoil in its final descent phase in accordance with one embodiment.

FIG. 4 illustrates parafoil 10 in final descent in accordance with one embodiment. During final phase two, parafoil 10 flares down with payload 12 anchored to target 16.

Figure 5:
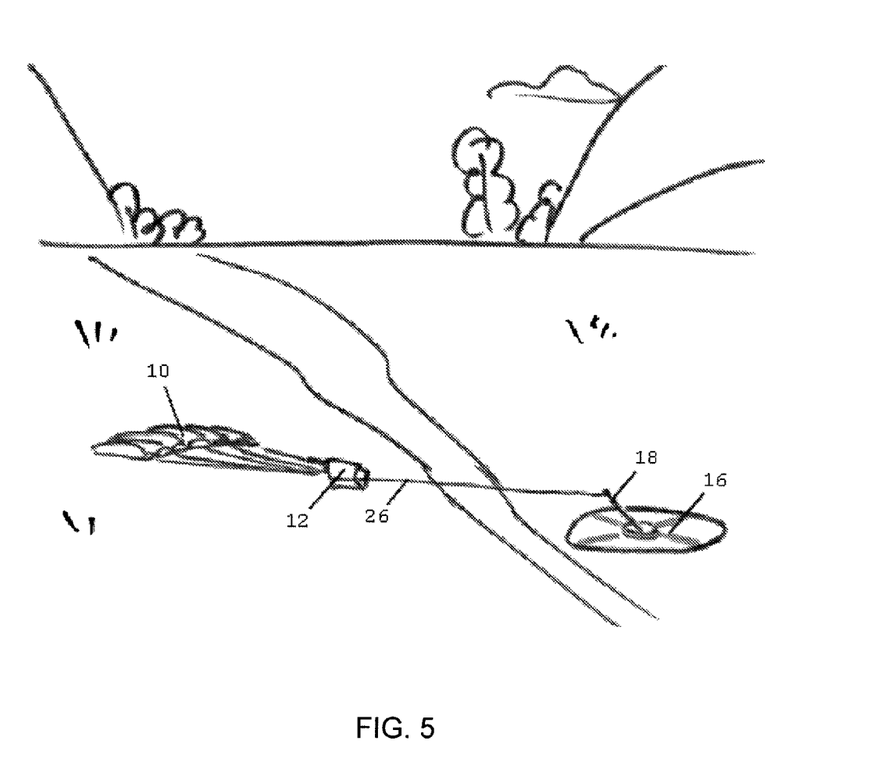
FIG. 5 illustrates the touchdown in accordance with one embodiment.

FIG. 5 illustrates touchdown of payload 12 in accordance with one embodiment. In one embodiment, in final phase two, the canopy of parafoil 10 and payload 12 are on the ground, attached to target 16 by harpoon 18 and rope 26. Guidance, navigation and control (GNC) system 28 initiates reel mechanism 20 to start spinning, e.g., reeling, causing rope 26 to be taken onto the reel and payload 12 to be moved, e.g., dragged, to target 16.

Figure 6:
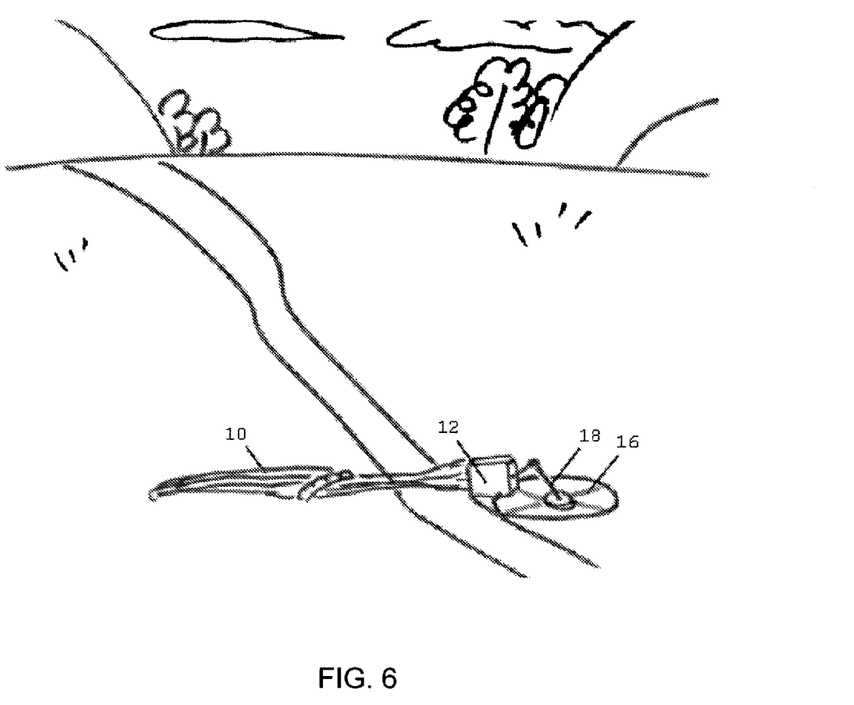
FIG. 6 illustrates the final delivery when the payload is successfully reeled to the target with high accuracy touchdown in accordance with one embodiment.

FIG. 6 illustrates the final delivery when payload 12 is successfully reeled to target 16 with high accuracy touchdown in accordance with one embodiment. In one embodiment, in final phase two, reel mechanism 20 ceases reeling action when payload 12 contacts target 16. Thus, payload 12 has been delivered to target 16 with high accuracy.

It can be understood by those of skill in the art that embodiments in accordance with the invention described herein can be modified to accommodate particular operating requirements and environments, and that the particular embodiments detailed herein are not intended to be limiting of the invention.

What is claimed is:

1. An unmanned high accuracy touchdown aerial delivery system for delivery of a payload to a target comprising:
   an unmanned autonomous ram-air parafoil, said parafoil deployable from an aircraft;
   a payload connected to said parafoil, said payload comprising:
   a high accuracy touchdown delivery system, said high accuracy touchdown delivery system comprising:
   a guidance, navigation and control (GNC) system for providing guidance, navigation and control of said parafoil;
   a target designator for optical identification of a target;
   a harpoon launcher for launching a harpoon to said target;
   a harpoon, said harpoon deployable to said target by said harpoon launcher, said harpoon connected to a rope;
   a rope, said rope attached to said harpoon and to a reel mechanism, said rope of a length deployable with said harpoon to a said target; and
   a reel mechanism, said reel mechanism including a reel, said reel mechanism for deploying said rope and for reeling in said rope after touchdown of said payload,
   wherein said payload is moved to said target providing high accuracy touchdown delivery of said payload to said target.

2. The aerial delivery system of claim 1 wherein said payload further comprises:
   at least one sub-payload.

3. A method for unmanned aerial delivery of a payload to a target with high accuracy touchdown comprising:
   deploying an unmanned autonomous ram-air parafoil from an aircraft, said autonomous ram-air parafoil including an attached payload, said payload comprising:
      a high accuracy touchdown delivery system, said high accuracy touchdown delivery system further comprising:
         a guidance, navigation and control (GNC) system for providing guidance, navigation and control of said parafoil;
         a target designator for optical identification of a target;
         a harpoon launcher for launching a harpoon to said target;
         a harpoon, said harpoon deployable to said target by said harpoon launcher, said harpoon connected to a rope;
         a rope, said rope attached to said harpoon and to a reel mechanism, said rope of a length deployable with said harpoon to said target; and
         a reel mechanism, said reel mechanism including a reel, said reel mechanism for deploying and reeling in said rope;
   acquiring a target determined by said target designator;
   determining a trajectory to said target determined by said GNC system;
   deploying a harpoon from said harpoon launcher to said target, said harpoon being attached to said payload by said rope;
   attaching said harpoon at said target;

permitting said payload to touchdown;

after touchdown of said payload, automatically activating said reel mechanism in said payload to start reeling up said rope onto said reel of said reel mechanism, wherein said payload is moved to said target providing high accuracy touchdown delivery of said payload to said target.

4. The method of claim 3 wherein said payload further comprises:

at least one sub-payload.

* * * * *